(12) United States Patent
Park

(10) Patent No.: US 8,391,235 B2
(45) Date of Patent: *Mar. 5, 2013

(54) APPARATUS AND METHOD OF HANDOVER FOR MOBILE NODE

(75) Inventor: Soo-hong Park, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 350 days.

This patent is subject to a terminal disclaimer.

(21) Appl. No.: 11/695,656

(22) Filed: Apr. 3, 2007

(65) Prior Publication Data

US 2007/0249349 A1    Oct. 25, 2007

Related U.S. Application Data

(63) Continuation of application No. 11/694,175, filed on Mar. 30, 2007.

(30) Foreign Application Priority Data

Apr. 21, 2006    (KR) .................................. 2006-36342

(51) Int. Cl.
*H04W 4/00*    (2009.01)
(52) U.S. Cl. ........ 370/331; 370/338; 370/389; 370/401; 370/465; 370/466; 455/436; 455/442
(58) Field of Classification Search .................. 370/331, 370/310, 338, 464, 466, 351–356, 389, 401; 455/436, 442
See application file for complete search history.

(56) References Cited

U.S. PATENT DOCUMENTS

| 6,845,091 B2 * | 1/2005 | Ogier et al. .................... 370/338 |
| 6,917,974 B1 * | 7/2005 | Stytz et al. .................... 709/225 |
| 7,047,001 B2 * | 5/2006 | Chen .......................... 455/422.1 |
| 7,130,614 B2 * | 10/2006 | Sreemanthula et al. ...... 455/411 |
| 7,298,743 B2 | 11/2007 | Markki et al. |
| 7,443,880 B2 | 10/2008 | Wetterwald et al. |
| 7,463,614 B2 * | 12/2008 | Bhatia et al. .................. 370/338 |

(Continued)

FOREIGN PATENT DOCUMENTS

| EP | 1524806 | 4/2005 |
| JP | 2003-18185 | 1/2003 |

(Continued)

OTHER PUBLICATIONS

Jordan, N., et al., "Link-Layer Support for Fast Mobile IPv6 Handover in Wireless LAN based Networks", Local and Metropolitan Area Networks, 2004, The 13$^{th}$ IEEE Workshop on Apr. 25-28, 2004, pp. 139-143.

(Continued)

*Primary Examiner* — Kamran Afshar
*Assistant Examiner* — Mong-Thuy Tran
(74) *Attorney, Agent, or Firm* — Staas & Halsey LLP

(57) ABSTRACT

Provided are an efficient handover apparatus and method in a mobile node. In the method in which a handover is performed in a mobile node which establishes a data communication through a point of attachment (PoA), the method including receiving information regarding capabilities of a new PoA; determining whether Internet protocol version 6 (IPv6) prefix is available at the new PoA, based on the information regarding the capabilities of the new PoA; and generating an address which is to be used by the mobile node in a data communication with the new PoA, according to a method determined based on whether IPv6 prefix is available at the new PoA. Thus, it is possible to determine whether IPv6 prefix is available at a new point of attachment prior to receiving a router advertisement (RA) message.

6 Claims, 5 Drawing Sheets

U.S. PATENT DOCUMENTS

| | | | |
|---|---|---|---|
| 7,545,754 | B2 | 6/2009 | Funato et al. |
| 7,698,463 | B2* | 4/2010 | Ogier et al. ............... 709/242 |
| 7,729,312 | B2 | 6/2010 | Suzuki et al. |
| 2002/0126642 | A1* | 9/2002 | Shitama ............... 370/338 |
| 2003/0227911 | A1* | 12/2003 | Trossen ............... 370/352 |
| 2003/0237002 | A1* | 12/2003 | Oishi et al. ............... 713/201 |
| 2004/0004967 | A1 | 1/2004 | Nakatsugawa et al. |
| 2004/0100951 | A1 | 5/2004 | O'neill |
| 2004/0136348 | A1 | 7/2004 | Han |
| 2004/0228304 | A1* | 11/2004 | Riedel et al. ............... 370/332 |
| 2004/0264474 | A1 | 12/2004 | Sbida |
| 2005/0018677 | A1 | 1/2005 | Lee et al. |
| 2005/0071627 | A1 | 3/2005 | Montenegro et al. |
| 2005/0163078 | A1 | 7/2005 | Oba et al. |
| 2005/0226189 | A1 | 10/2005 | Janneteau et al. |
| 2005/0265360 | A1 | 12/2005 | Kim et al. |
| 2006/0018296 | A1 | 1/2006 | Muraoka et al. |
| 2006/0029020 | A1 | 2/2006 | Jung et al. |
| 2006/0056369 | A1 | 3/2006 | Morishige et al. |
| 2006/0062176 | A1 | 3/2006 | Ikemura et al. |
| 2006/0159100 | A1 | 7/2006 | Droms et al. |
| 2006/0179480 | A1 | 8/2006 | Jardin et al. |
| 2006/0227746 | A1* | 10/2006 | Kim et al. ............... 370/331 |
| 2006/0268782 | A1* | 11/2006 | Kwak et al. ............... 370/331 |
| 2006/0274743 | A1* | 12/2006 | Yegin et al. ............... 370/389 |
| 2006/0280146 | A1* | 12/2006 | Koodli et al. ............... 370/331 |
| 2007/0008906 | A1 | 1/2007 | Han et al. |
| 2007/0097921 | A1* | 5/2007 | Choi et al. ............... 370/331 |
| 2007/0104143 | A1 | 5/2007 | Hori |
| 2007/0189219 | A1 | 8/2007 | Navali et al. |
| 2008/0004018 | A1 | 1/2008 | Adachi et al. |
| 2009/0135758 | A1 | 5/2009 | Alper et al. |

FOREIGN PATENT DOCUMENTS

| | | |
|---|---|---|
| JP | 2003-289306 | 10/2003 |
| JP | 2004-80791 | 3/2004 |
| JP | 2006-87039 | 3/2006 |
| KR | 2002-0023918 | 3/2002 |
| KR | 10-2005-0065990 | 6/2005 |
| KR | 10-2006-0128638 | 12/2006 |
| KR | 10-2006-0134770 | 12/2006 |
| RU | 2 224 374 V3 | 2/2004 |
| RU | 2005102487 A | 7/2005 |
| WO | 2005/053250 A1 | 6/2005 |

OTHER PUBLICATIONS

IEEE 802.21 MIH Services (Proposal for 802.21, 21, 21-05-0298-01-0000-Section5-Draft1.doc (http://www.ieee802.org/21)), Jul. 11, 2005.

PCT International Search Report and Written Opinion issued in International Application No. PCT/KR2007/001689 issued Jul. 23, 2007.

U.S. Office Action mailed Sep. 16, 2009 in related U.S. Appl. No. 11/694,175.

U.S. Office Action for related U.S. Appl. No. 11/694,175; mailed Apr. 7, 2010.

Russian Office Action issued Jun. 7, 2010 in corresponding Russian Patent Application 2008141285.

U.S. Appl. No. 11/694,175, filed Mar. 30, 2007, Soo-Hong Park, Samsung Electronics Co., Ltd.

Office Action dated Jan. 20, 2011 for related U.S. Appl. No. 11/694,175.

Advisory Action dated Jul. 20, 2010 for related U.S. Appl. No. 11/694,175.

Japanese Office Action issued Jan. 31, 2012 in corresponding Japanese Patent Application 2009-506402.

Korean Notice of Allowance for corresponding Korean Patent Application No. 10-2006-0036342 dated May 29, 2007.

Advisory Action dated for related U.S. Appl. No. 11/694,175, Nov. 18, 2011.

U.S. Notice of Allowance mailed Aug. 30, 2012 in related U.S. Appl. 11/694,175.

Final Office Action dated Jul. 28, 2011 for related U.S. Appl. No. 11/694,175.

Soohng Daniel Park, "IEEE 802.21 Media Independent Handover PoA Capabilities of IE with IPv6 Prefix Availability; 21-06-0602-00-0000_PoA Capability_Prefix_Availability" IEEE Draft, vol. 802.21, Apr. 20, 2006, pp. 1-6.

"Draft IEEE Standard for Local and Metropolitan Area Networks: Media Independent Handover Series" vol. 802.21, No. D00-05, Feb. 2, 2006, pp. 1-169.

European Office Action dated Dec. 6, 2012 issued in corresponding European Patent Application 07745852.9.

European Search Report dated Dec. 13, 2012 issued in corresponding European Patent Application 07745852.9.

* cited by examiner

FIG. 3

| Type | Description | Length | Value |
|---|---|---|---|
| TYPE_IE_POA_CAPABILITIES | PoA Capabilities | 4 octets | PoA Capabilities bitmap<br><br>Bit 0: Security Y/N<br>Bit 1: QoS Y/N<br>Bit 2: Internet Access Y/N<br>Bit 3: IP Version 4 Y/N<br>Bit 4: IP Version 6 Y/N —— 300<br>Bit 5: IP Version 6 Prefix Available Y/N —— 310<br>Bit 6: Emergency Services Y/N<br>Bit 7-31: Reserved |

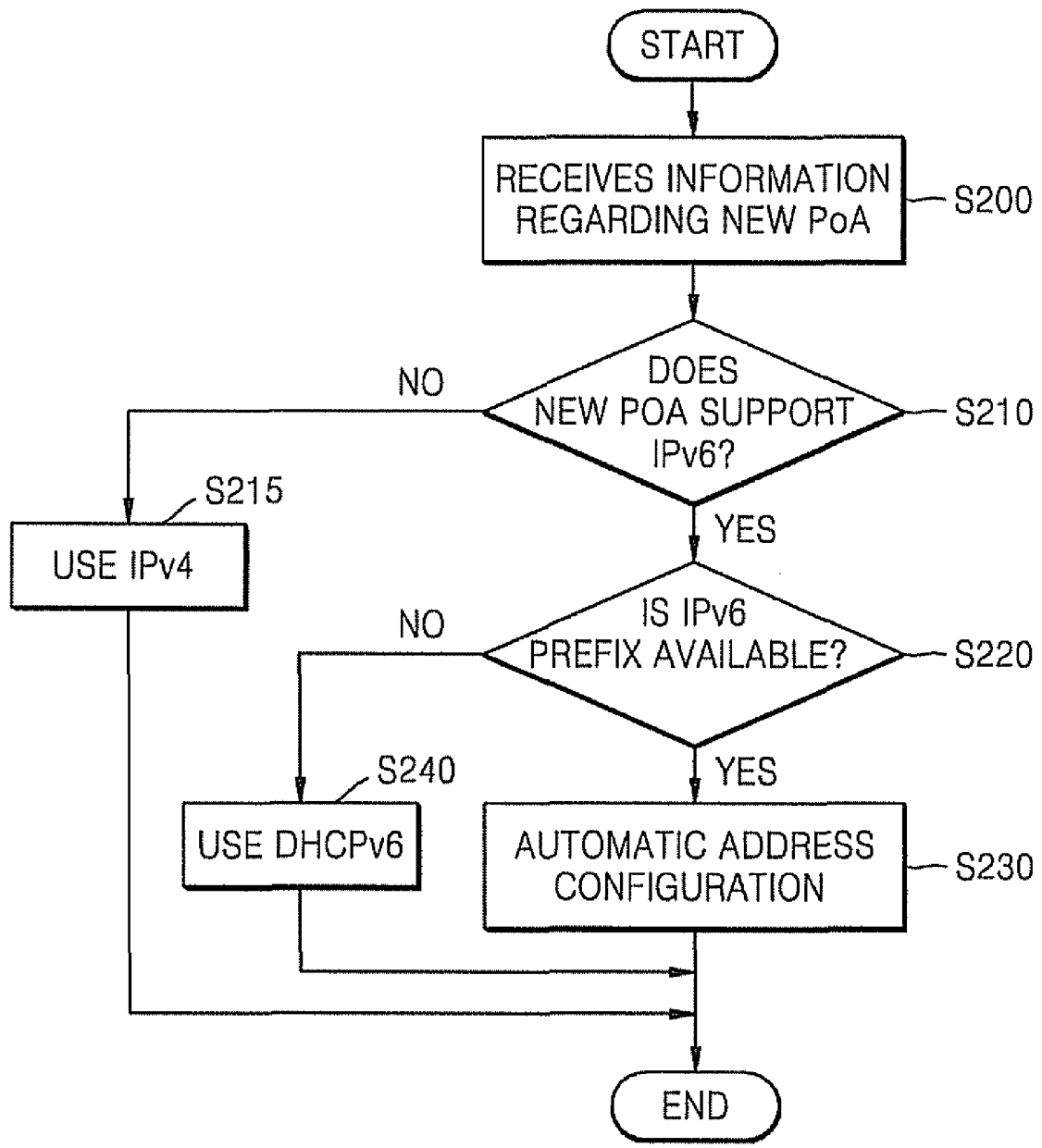

APPARATUS AND METHOD OF HANDOVER FOR MOBILE NODE

CROSS-REFERENCE TO RELATED APPLICATIONS

This application is a continuation of U.S. patent application Ser. No. 11/694,175, filed Mar. 30, 2007 in the United States Patent and Trademark Office, currently pending, which claims the benefit of Korean Patent Application No. 2006-36342, filed on Apr. 21, 2006 in the Korean Intellectual Property Office, the disclosures of which are incorporated herein by reference.

BACKGROUND OF THE INVENTION

1. Field of the Invention

Aspects of the present invention relate to mobile communications, and more particularly, to a handover in a mobile node.

2. Description of the Related Art

Advancements in communication technology have resulted in several types of communication networks. Typical examples of communication networks include Wireless Local Area Network (WLAN) links based on the Institute of Electrical and Electronics Engineers (IEEE) 802.11 standard, the IEEE 802.15 standard, and the IEEE 802.16 standard; and cellular links based on the 3rd Generation Partnership Project (3GPP) and 3GPP2. Mobile nodes including different types of link interfaces to allow connection to various links have been introduced. A standard (IEEE 802.21) to support handovers between the various types of links has been established as well.

The IEEE 802.21 standard supports a media-independent handover (MIH) between various links. The IEEE 802.21 standard presently under discussion specifies, among other things, a Point of Attachment (PoA) capabilities information element (IE) to deliver PoA capabilities information to a mobile node. The PoA capabilities IE represents the security for and the quality of service (QoS) of a PoA, whether the PoA supports Internet Protocol (IP) version 4 (IPv4) or IP version 6 (IPv6).

Even if the PoA supports IPv6, it is important to learn beforehand whether a mobile node will use an IPv6 prefix to generate an address to be used for communication with the PoA. However, the IEEE 802.21 standard currently under discussion does not consider this issue. Accordingly, when following the current standard, use of a router solicitation (RS) message or a router advertisement (RA) message causes delays in generating an IPv6 address.

SUMMARY OF THE INVENTION

Aspects of the present invention provide an apparatus and method for effectively performing a handover by delivering information regarding whether an IPv6 prefix is available between a Point of Attachment (PoA) and a mobile node.

Aspects of the present invention also provide a computer readable medium having recorded thereon a computer program for the handover method.

According to an aspect of the present invention, there is provided a method of performing a handover in a mobile node which establishes a data communication through a point of attachment (PoA), the method comprising receiving information regarding capabilities of a new PoA; determining whether an Internet protocol version 6 (IPv6) prefix is available at the new PoA, based on the information regarding the capabilities of the new PoA; and generating an address to be used by the mobile node in a data communication with the new PoA, based on whether an IPv6 prefix is available at the new PoA.

According to another aspect of the present invention, there is provided an apparatus to perform a handover in a mobile node which establishes a data communication through a point of attachment (PoA), the apparatus comprising a PoA information receiving unit to receive information regarding capabilities of a new PoA; a PoA capabilities determination unit to determine whether an IPv6 prefix is available at the new PoA, based on the information regarding the capabilities of the new PoA; and an address generator to generate an address to be used by the mobile node in a data communication with the new PoA, based on whether IPv6 prefix is available at the new PoA.

According to another aspect of the present invention, there is provided a method of providing information about a handover from an information server to a mobile node, the method comprising transmitting information to the mobile node from the information server, wherein the information regards capabilities of a new point of attachment (PoA), to which the mobile node is to be connected, and wherein the mobile node generates an address to be used in a data communication with the new PoA, based on the information regarding the capabilities of the new PoA.

According to another aspect of the present invention, there is provided an information server to provide information regarding a handover to a mobile node, the information server comprising a point of attachment (PoA) information transmitting unit to transmit information regarding capabilities of a new PoA to the mobile node, wherein the mobile node generates an address to be used in a data communication with the new PoA based on the information regarding the capabilities of the new PoA.

According to another aspect of the present invention, there is provided an information storage medium having recorded thereon computer-executed instructions to perform a method comprising receiving a message comprising information regarding capabilities of a new point of attachment (PoA) and performing a handover based on the message, wherein the message comprises a PoA capabilities information element containing the information regarding the capabilities of the new PoA.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a table illustrating the particulars of a point of attachment capabilities information element (PoA capabilities IE) according to an embodiment of the present invention;

FIG. 5 is a flowchart illustrating a handover method according to an embodiment of the present invention.

DETAILED DESCRIPTION OF THE EMBODIMENTS

Figure 1:
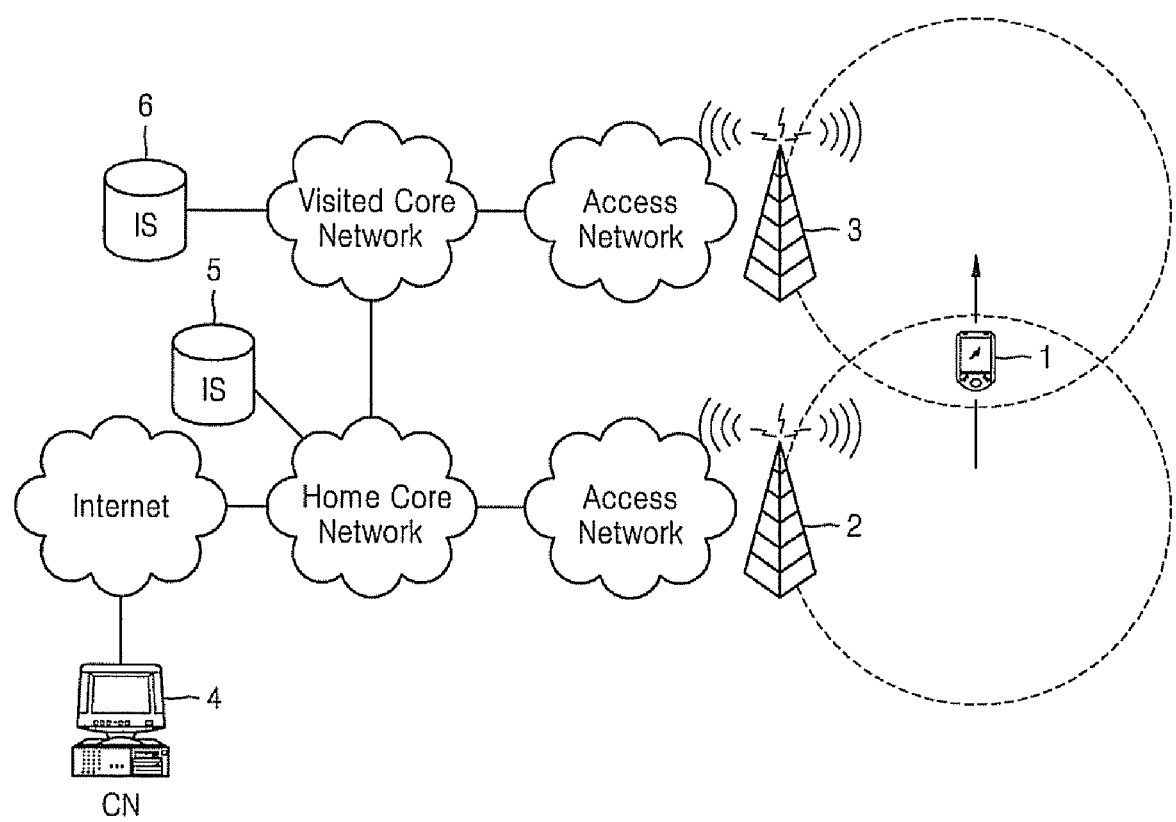
FIG. 1 is a diagram of a mobile communication environment according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a diagram illustrating a mobile communication environment according to an embodiment of the present invention. Referring to FIG. 1, the mobile communication environment includes a mobile node (MN) 1, a plurality of points of attachment (PoAs) 2 and 3, a corresponding node (CN) 4, information servers (ISs) 5 and 6, and a plurality of networks. However, it would be apparent to those of ordinary skill in the art that the network topology illustrated in FIG. 1 is not limited thereto and can be constructed in many possible ways.

The mobile node 1 is a mobile terminal that uses the mobile communication environment. When starting mobile communication, the mobile node 1 registers a home address (HoA) with a home agent in a home network. When moving to a new network, the mobile node 1 obtains a Care of Address (CoA) from a foreign agent (FA) in the new network. The mobile node 1 delivers the CoA to the home agent so as to register the CoA with the home agent. The home agent then matches the CoA and the HoA with each other.

The corresponding node 4 must learn the address of the mobile node 1 in order to transmit data to the mobile node 1. Since the corresponding node 4 knows the HoA, the corresponding node 4 transmits data by setting the HoA as a target address. The home agent receives the data with the HoA as the target address. The home knows the CoA corresponding to the HoA and thus forwards the data to the mobile node 1 by setting the CoA as the target address. The data is delivered to the mobile node 1 via the network.

A PoA (such as PoA 2) connects the mobile node 1 to the network. Examples of PoAs include access points (AP) and a base stations (BS), but they are not limited thereto. The PoA may be any device that can allow data exchange between the mobile node 1 and the network.

When the mobile node 1 moves to another network, a handover is performed. A handover process will now be described with reference to FIG. 1. As illustrated in FIG. 1, while communicating with the network via the PoA 2, the mobile node 1 moves to an area where a data communication with the network is established via the PoA 3.

The mobile node 1 receives information regarding the PoA 3 (a new PoA) via the PoA 2 (a current PoA.) The information regarding the PoA 3 may be received from the information servers 5 and 6 or directly from the PoA 3. The mobile node 1 can recognize from the received information which protocol the PoA 3 (the new PoA) uses and which service the PoA 3 supports, and prepare accordingly.

During the handover process, it is important to set the CoA, the address that the mobile node 1 will use in a new network. In general, addresses, such as a CoA, are set by receiving a router advertisement (RA) message containing network information from a PoA and using the RA message to set an address. However, for effective use of network bandwidth, an RA message is transmitted after a certain amount of time. Thus, a delay (RA delay) occurs in receiving the RA message. A router solicitation (RS) message requesting transmission of the RA message may be transmitted to a PoA. Even if the transmission of the RS message reduces the RA delay, there is still a delay (RS delay) between the time when the RS message is transmitted and the time when the RA message is received.

IPv6 supports automatic address configuration and uses a 128-bit address. The PoA generally inserts 64-bit network information into the RA message and transmits the RA message. The 64-bit network information is the upper 64 bits of the IPv6 address, which is referred to as the "IPv6 prefix." The mobile node 1 generates the lower 64 bits of the IPv6 address from unique information of the mobile node 1. Thus, the 64-bit network information contained in the RA message and the 64-bit address generated by the mobile node 1 are combined to generate a 128-bit IPv6 address. This process is referred to as automatic address configuration.

However, even if the PoA supports IPv6, automatic address configuration using the IPv6 prefix may not be supported. In this case, the RA message does not contain an IPv6 prefix, and thus, the mobile node 1 must generate an address using another technique. For example, the mobile node may use Dynamic Host Configuration Protocol (DHCP), or an address that has been predetermined by a user. The DHCP to generate IPv6 addresses is referred to as "DHCP version 6 (DHCPv6)." Hereinafter, when a connection is established to a PoA that does not support IPv6 prefixes, various techniques to generate an address, other than automatic address configuration, will be referred to as "DHCPv6." However, other aspects of the present invention may employ different techniques to generate an IPv6 address for the mobile node 1.

If the mobile node 1 can recognize beforehand that the PoA does not support IPv6 prefixes, the mobile node 1 can prepare to perform DHCPv6 immediately without waiting for an RA message. The mobile node 1 also need not transmit an RS message. As a result, it is possible to prevent unnecessary RA or RS delays.

Figure 2:
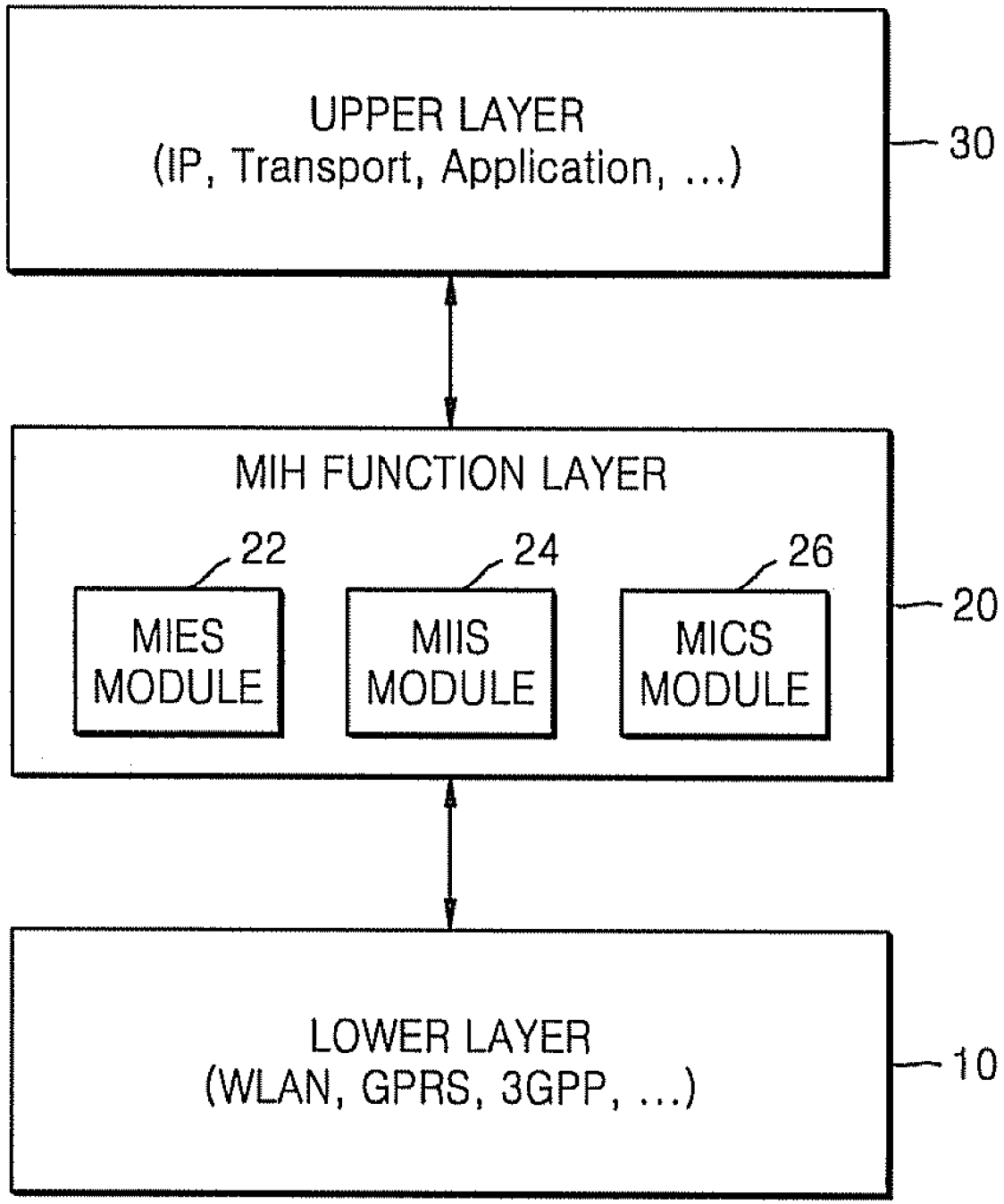
FIG. 2 is a block diagram of network layers of a mobile node according to an embodiment of the present invention.

FIG. 2 is a block diagram of network layers of a mobile node according to an embodiment of the present invention. The network layers include a lower layer 10, a MIH function layer 20, and an upper layer 30. The lower layer 10 includes a second layer and the lower layers defined by the Open Systems Interconnection (OSI) reference model (the link layer and the physical layer). The upper layer 30 includes a third layer and the upper layers defined by the OSI reference model: the Internet Protocol (IP) layer, a mobile IP layer, the transport layer, and the application layer.

The MIH function layer 20 is not defined by the OSI reference model. Instead, the MIH function layer 20 is defined according to the IEEE 802.21 standard. The MIH function layer 20 is a 2.5 layer between the lower layer 10 and the upper layer 30 and supports a handover in the lower layer 10 and the upper layer 30.

The MIH function layer 20 supports a handover between different links, without regard to the media type of a link to which the mobile node 1 is connected. That is, the MIH function layer 20 supports a handover between different links, without regard to the type of a link interface corresponding to the lower layer 10. The MIH function layer 20 includes a Media-Independent Event Service (MIES) module 22, a Media-independent Information Service (MIIS) module 24, and a Media-Independent Command Service (MICS) module 26.

The MIES module 22 checks whether the mobile node 1 has generated an event related to a handover among various links and reports generation of the event to the upper layer 30. More specifically, the MIES module 22 requests the mobile node 1 to register the corresponding node so that the corresponding node 4 can receive the report on the generation of the event, and determines whether an event occurs by receiving a message informing the generation of the event from the mobile node 1 which the corresponding node 4 is registered to.

The MIIS module 24 obtains information regarding the mobile node 1's handover between different links, either from the information servers 5 and 6 or from a PoA that collects information regarding a handover between different links performed by the mobile node 1. The MICS module 26 controls a handover at the lower layer 10, that is, at a link layer, according to a command input from the upper layer 30, such as a command input by a user.

A handover apparatus and a method according to an embodiment of the present invention are particularly related to the MIIS module 24. The MIIS module 24 receives a PoA capabilities IE which is information of the capabilities of a new PoA, and evaluates a network environment through the new PoA by using the PoA capabilities IE.

FIG. 3 is a table illustrating the content of a PoA capabilities IE according to an embodiment of the present invention. The PoA capabilities IE includes an IPv6 field 300 in its $4^{th}$ bit indicating whether a new PoA supports IPv6 and an IPv6 prefix available field 310 in its $5^{th}$ bit indicating whether an IPv6 prefix is available at the new PoA. The MIIS module 24 may determine whether a new PoA supports IPv6 by using the IPv6 field 300 and may determine whether an IPv6 prefix is available at the new PoA by using the IPv6 prefix available field 310.

Figure 4:
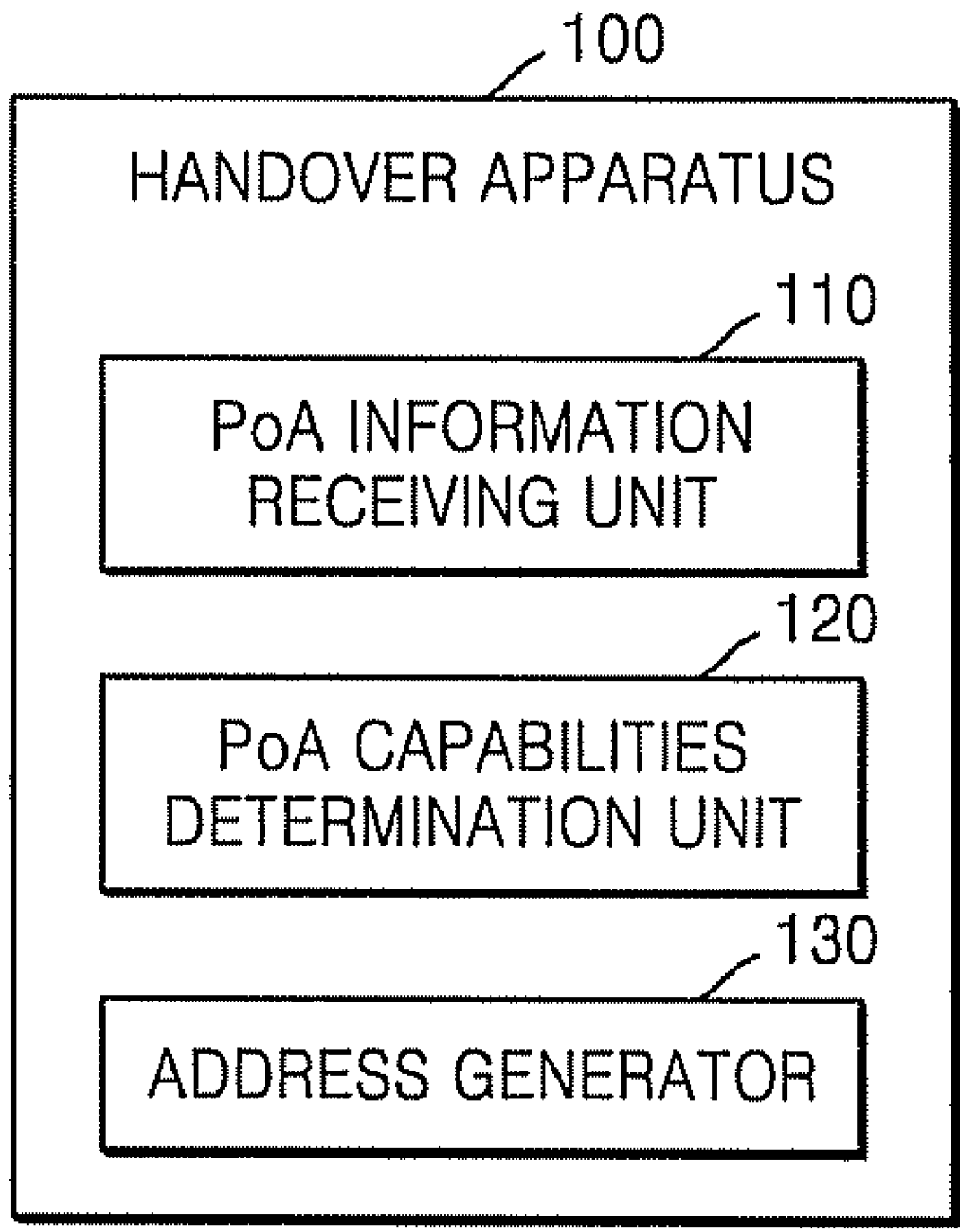
FIG. 4 is a block diagram of a handover apparatus according to an embodiment of the present invention.

FIG. 4 is a block diagram of a handover apparatus 100 according to an embodiment of the present invention. The handover apparatus 100 may include a PoA information receiving unit 110, a PoA capabilities determination unit 120, and an address generator 130.

The PoA information receiving unit 110 receives information regarding a new PoA. The PoA capabilities determination unit 120 determines, based on the information received regarding the new PoA, whether the new PoA supports IPv6 and whether an IPv6 prefix is available at the new PoA. As described above, the PoA capabilities determination unit 120 may be embodied in the MIIS module 24 of FIG. 2 but is not limited thereto. For example, the PoA capabilities determination unit 120 may be realized as a module outside the MIIS module 24.

The address generator 130 generates an address, i.e., a CoA, which a mobile node will use in a data communication with the new PoA. Generating the CoA is determined according to whether the new PoA supports IPv6 and whether IPv6 prefix is available at the new PoA. If the new PoA supports IPv6 and an IPv6 prefix is available at the PoA, the CoA is generated using automatic address configuration of IPv6. If the new PoA supports IPv6 but an IPv6 prefix is not available at the new PoA, the CoA is generated using DHCPv6.

FIG. 5 is a flowchart illustrating a handover method according to an embodiment of the present invention. Specifically, the PoA information receiving unit 110 shown in FIG. 4 receives a PoA capabilities IE to obtain information regarding a new PoA (S200).

The PoA capabilities determination unit 120 learns the capabilities of the new PoA in order to generate an address. First, the PoA capabilities determination unit 120 uses the 4th bit of the PoA capabilities IE (S210) to determine whether the new PoA supports IPv6. If the new PoA does not support IPv6, the mobile node 1 establishes a communication by using the new PoA and IPv4 (S215). Communication using IPv4 is well known to the technical fields to which the present invention pertains, and thus, a description thereof will be omitted.

If the new PoA does support IPv6, the PoA capabilities determination unit 120 determines whether an IPv6 prefix is available at the new PoA (S220). If an IPv6 prefix is available at the new PoA, the address generator 130 generates a CoA according to automatic address configuration (S230). Accordingly, an RA message is received from the new PoA and a 128-bit IPv6 address is created by combining the 64-bit IPv6 prefix contained in the RA message and a 64-bit lower address generated by the mobile node.

If an IPv6 prefix is not available at the new PoA, the address generator 130 generates a CoA using a technique that does not use IPv6 prefixes, for example, using DHCPv6 or using an address predetermined by a user (S240).

The present invention can be embodied as code, which can be read by a computer (any device capable of processing information), in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on.

As described above, in a handover apparatus and method according to aspects of the present invention, whether an IPv6 prefix is available at a new PoA can be determined based on PoA capabilities IE, prior to receiving an RA message. Accordingly, it is possible to prepare for DHCPv6 that does not use an IPv6 prefix, and prevent transmission of an unnecessary RS message. Also, since there is no need to wait for an RA message or to transmit an RS message, it is possible to prevent unnecessary delays during a handover. Furthermore, it is possible to use network bandwidth for a handover efficiently by preventing transmission of an unnecessary RS message.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing information about a handover from an information server to a mobile node, the method comprising:

transmitting information to the mobile node from the information server, wherein the information regards capabilities of a new point of attachment (PoA) to which the mobile node is to be connected, the information including an Internet protocol version 6 (IPv6) prefix available field indicating whether the IPv6 prefix is available at the new PoA, and wherein the mobile node generates an address to be used by the mobile node in a data communication with the new PoA based on the IPv6 prefix available field, wherein the transmitting of the information regarding the capabilities of the new PoA comprises transmitting a PoA capabilities information element containing the information regarding the capabilities of the new PoA, wherein the PoA capabilities information element comprises a value field representing the information regarding the capabilities of the new PoA in a form of a bit map, wherein a fifth bit of the value field comprises the IPv6 prefix available field indicating whether the IPv6 prefix is available at the new PoA.

2. The method of claim 1, wherein the PoA capabilities information element further comprises:
   a type field identifying the PoA capabilities information element; and
   a length field indicating the length of information contained in the PoA capabilities information element.

3. The method of claim 1, wherein the transmitting of the information regarding the capabilities of the new PoA comprises transmitting the information regarding the capabilities of the new PoA from the information server to a media-independent information service module included in a media-independent handover function layer of the mobile node.

4. An information server to provide information regarding a handover to a mobile node, the information server comprising:
   a point of attachment (PoA) information transmitting unit to transmit information regarding capabilities of a new PoA to the mobile node, the information including an Internet protocol version 6 (IPv6) prefix available field indicating whether the IPv6 prefix is available at the new PoA,
   wherein the mobile node generates an address to be used by the mobile node in a data communication with the new PoA based on the IPv6 prefix available field,
   wherein the PoA information transmitting unit transmits a PoA capabilities information element containing the information regarding the capabilities of the new PoA,
   wherein the PoA capabilities information element comprises a value field representing the information regarding the capabilities of the new PoA in a form of a bit map,
   wherein a fifth bit of the value field comprises the IPv6 prefix available field indicating whether an IPv6 prefix is available at the new PoA.

5. The information server of claim 4, wherein the PoA capabilities information element further comprises:
   a type field identifying the PoA capabilities information element; and
   a length field indicating the length of information contained in the PoA capabilities information element.

6. The information server of claim 4, wherein the PoA information transmitting unit transmits the information regarding the capabilities of the new PoA to a media-independent information service module included in a media-independent handover function layer of the mobile node.

* * * * *